United States Patent Office 2,706,885
Patented Apr. 26, 1955

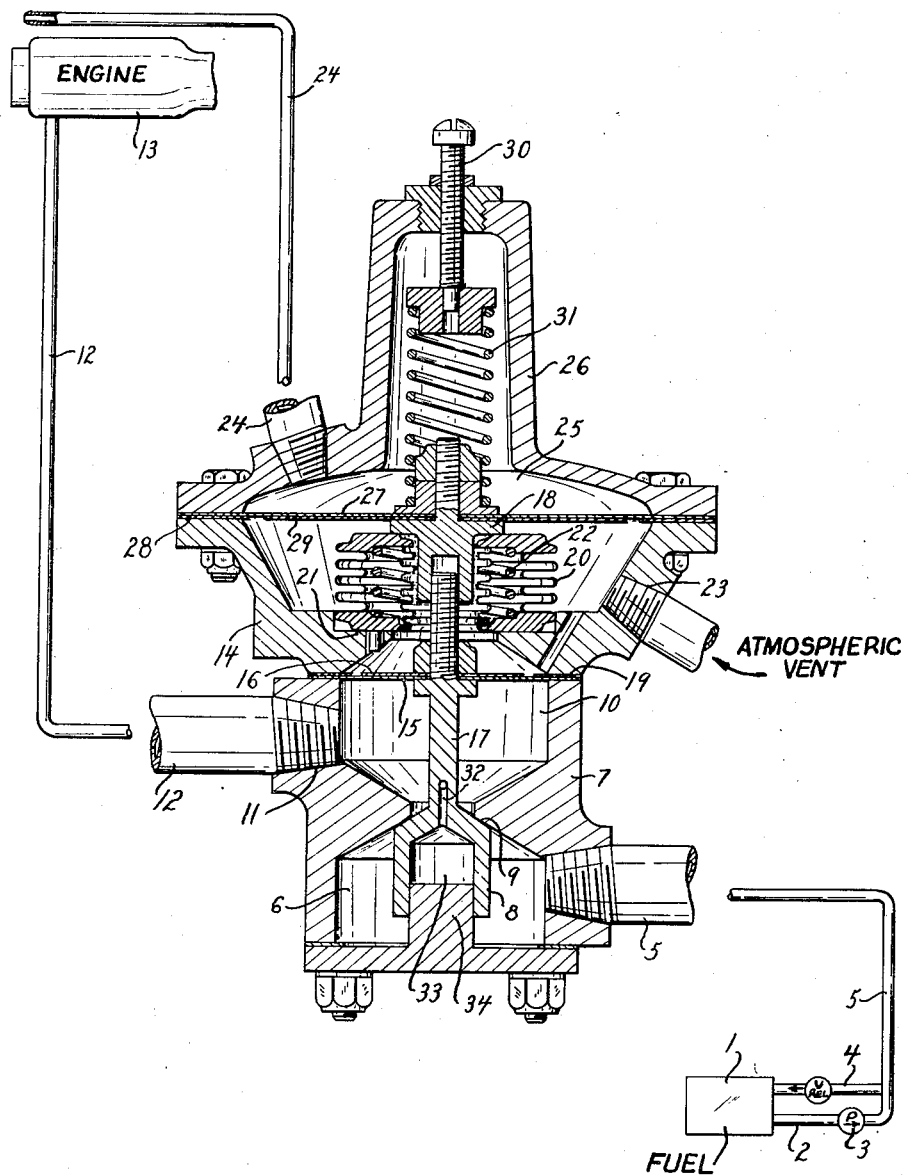

2,706,885

FUEL REGULATOR RESPONSIVE TO SPEED AND ATMOSPHERIC PRESSURE

Harold H. Ostroff and Alb C. Ballauer, Ferguson, and James J. Mazzoni, Richmond Heights, Mo., assignors to McDonnell Aircraft Corporation, St. Louis, Mo., a corporation of Maryland Application January 15, 1948, Serial No. 2,466

3 Claims. (Cl. 60—35.6)

This invention relates to an aircraft engine fuel control system and is more particularly directed to an improved fuel flow regulator for jet engines.

The object of this invention is to provide a regulator for jet engines that will vary the fuel supply thereto in accordance with air speed and altitude conditions so as to produce optimum power.

A further object of the invention is to provide means in a regulator that will enable it to be used for a wide variety of engines having different fuel flow requirements.

To obtain optimum power from a jet engine it is necessary to establish a predetermined relationship between fuel flow and air speed and to establish a predetermined relationship between fuel flow and altitude. To accomplish these relationships fuel must be metered to the engine according to these variables for any one engine. The regulator disclosed herein controls fuel flow to the engine in proportion to air speed and altitude so that optimum power is produced under all conditions within the operating range of the engine.

The single figure of the drawing illustrates one suitable construction and the parts that control and are controlled by the regulator.

Fuel is supplied to the regulator from a tank 1 to which a conduit 2 is connected that leads to a pump 3 which delivers fuel under pressure. A conduit 4 containing a suitable relief valve is interposed between conduit 5 on the outlet side of the pump and the tank 1. Conduit 5 is connected to a chamber 6 in bodypart 7 of the regulator, the lower end of part 7 being closed by a suitable cover. A valve 8 is engageable with valve seat 9 in part 7. The taper on valve 8 and seat 9 is not equal so that there is substantially a line contact between the two when the valve is closed. Valve 8 controls the flow of fluid into chamber 10 and from there it flows through port 11 into conduit 12 and to engine 13.

The altitude compensating means for fuel control is disposed in the chamber in body part 14 of the regulator that is suitably secured to part 7. A diaphragm 15 is disposed between the parts and is suitably backed by a diaphragm plate 16. The stem 17 of valve 8 is connected to plate 16 and diaphragm 15 and extends upwardly and is then secured to a member 18.

A mask 19 is positioned above the diaphragm between the parts 7 and 14 so that the effective area of the diaphragm 15 on which fuel under pressure acts, may be varied so that one regulator may be used with an engine having different fuel flow requirements in order to secure the desired relationship of effective diaphragm area to effective bellows area. An evacuated bellows 20 is disposed between the part 18 and a shoulder 21 in part 14. Spring 22 is disposed within the bellows to maintain the bellows in a predetermined extended condition. A port 23 in part 14 is connected to atmosphere, thereby placing the chamber in part 14 at the particular atmospheric pressure at which the plane is operating and subjects the bellows 20 to such pressure and thereby imposes altitude control on the regulator fuel valve.

Air speed control is imposed on the regulator by means of a Pitot tube 24 whose inlet is preferably disposed adjacent the forward part of the engine or plane and is connected to a chamber 25 in body part 26 of the regulator that is suitably secured to part 14. A diaphragm 27 and a mask 28 are disposed between the two parts and a diaphragm backing plate 29 is applied to the diaphragm. The size of the opening in mask 28 may be varied for use with engines having different fuel flow requirements in order to secure the desired relationship of effective areas between diaphragms 27 and 15. A member 18 is secured to the diaphragm and backing plate so that air speed control is applied to valve 8. Manual adjustment is applied to the regulator by means of screw 30 and spring 31 which is disposed between member 18 and the screw by a suitable mechanism.

Chattering of the fuel valve 8 is prevented by providing a passageway 32 in stem 17 that connects chamber 10 with chamber 33, thereby tending to equalize pressure on both sides of valve 8. A close sliding fit exists between the walls of chamber 33 and the boss 34. Another advantage gained by the use of the aforesaid balanced valve structure is the elimination of fuel output pressure fluctuation when minor fluctuations occur in input fuel pressure.

The basic pressure of the fuel delivered by the regulator to engine 13 may be adjusted by screw 30 and spring 31. This establishes the initial adjustment so that the engine 13 receives the correct amount of fuel for optimum output. When the plane gains speed, air speed pressure, as transmitted by the Pitot tube 24, is imposed on diaphragm 27, generating an opening force on valve 8 proportional to the air speed pressure. This upsets the original equilibrium where the force generated by the fuel pressure acting upon diaphragm 15 was balanced by the force imposed by spring 31. Valve 8 will then seek a new position of greater opening, thus re-establishing an equilibrium of forces but at a higher fuel pressure in chamber 10. As the plane gains altitude, pressure on the bellows decreases by reason of a decrease in atmospheric pressure thereon which generates a closing force on valve 8 proportional to the change in atmospheric pressure. This again upusets the equilibrium of forces acting on valve 8, causing valve 8 to seek a new position of smaller opening, thus re-establishing an equilibrium of forces at a lower fuel pressure in chamber 10. The effective areas of the diaphragms 27 and 15, and bellows 20 are so proportioned as to vary the fuel pressure, and thus the fuel flow, in accordance with the varying engine requirements.

This regulator may be employed on a wide range of engine sizes by changing masks 19 and 28 whereby the effective areas of the diaphragms with which they are associated may be varied. Variations in fuel pump pressure do not affect the pressure of the fuel delivered to the engine provided the pump pressure is greater than that required by the engine.

What we claim is:

1. A fuel regulator for an engine capable of flying at various speeds and altitudes comprising a housing, a valve seat in said housing forming two chambers therein to one of which fuel under pressure is supplied, a valve engageable with said seat for regulating the flow of fuel from one chamber to the other, a second housing mounted on said housing, a diaphragm and mask assembly interposed between said housings and connected to said valve and responsive to fuel pressure for regualting said valve to closed position, a second diaphragm and mask assembly in said second housing one side of which is responsive to ram pressure and the other side responsive to atmospheric pressure and connected to said valve, an evacuated spring supported bellows acting on the side of said second mentioned assembly responsive to atmospheric pressure and connected to the valve for regulating said valve to closed position, and a spring acting on the other side of said second assembly responsive to ram pressure and connected to the valve for regulating said valve to open position.

2. A fuel regulator for an engine capable of flying at various speeds and altitudes comprising a housing to which fuel under pressure is supplied, a valve seat in said housing a valve engageable in said seat for regulating the flow of fuel from said housing, a second housing mounted on said fuel housing, a diaphragm and mask assembly between said housings and connected to said valve and responsive to fuel pressure for regulating said valve to closed position, a second diaphragm and mask assembly in said second housing one side of which is responsive to ram pressure and the other side to atmospheric pressure and connected to said valve for regulating the valve, an evacuated spring supported bellows acting on the side of said second assembly responsive to atmospheric pressure and connected to the valve for regulating said valve to closed position, and a spring acting on the side of said second assembly responsive to ram pressure and connected to the valve for regulating said valve to open position.

3. A fuel regulator for an engine capable of flying at various speeds and altitudes comprising a housing, a valve seat in said housing forming two chambers therein to one of which fuel under pressure is supplied, a valve engageable with said seat for regulating the flow of fuel from one chamber to the other, means for substantially equalizing the pressure on both sides of said valve, a second housing mounted on said housing, a diaphragm and mask assembly interposed between said housings and connected to said valve and responsive to fuel pressure for regulating said valve to closed position, a second diaphragm and mask assembly in said second housing one side of which is responsive to ram pressure and the other side responsive to atmospheric pressure and connected to said valve, an evacuated spring supported bellows acting on the side of said second assembly responsive to atmospheric pressure and connected to the valve for regulating said valve to closed position, and a spring acting on the side of said second assembly responsive to ram pressure and connected to the valve for regualting said valve to open position.

References Cited in the file of this patent

UNITED STATES PATENTS

| | | |
|---|---|---|
| 647,758 | Orr | Apr. 17, 1900 |
| 1,631,262 | Gourdou | June 7, 1927 |
| 2,169,683 | Dunham | Aug. 15, 1939 |
| 2,274,693 | Heinrich et al. | Mar. 3, 1942 |
| 2,283,175 | Berger | May 19, 1942 |
| 2,302,014 | Fausek et al. | Nov. 17, 1942 |
| 2,313,149 | Jacobsson | Mar. 9, 1943 |
| 2,318,228 | Jones | May 4, 1943 |
| 2,503,048 | Ifield | Apr. 4, 1950 |
| 2,511,213 | Leslie | June 13, 1950 |
| 2,609,662 | Vogt et al. | Sept. 9, 1952 |
| 2,638,739 | Barr | May 19, 1953 |
| 2,638,992 | Lundquist et al. | May 19, 1953 |
| 2,642,237 | Page et al. | June 16, 1953 |
| 2,688,845 | Ostroff | Sept. 14, 1954 |

FOREIGN PATENTS

| | | |
|---|---|---|
| 537,026 | Great Britain | June 5, 1941 |
| 544,048 | Great Britain | Mar. 25, 1942 |